(12) United States Patent
Ichikawa et al.

(10) Patent No.: US 8,573,570 B2
(45) Date of Patent: Nov. 5, 2013

(54) FLUID-FILLED VIBRATION DAMPING DEVICE

(75) Inventors: Hiroyuki Ichikawa, Kani (JP); Yuichi Ogawa, Kasugai (JP); Naoki Furumachi, Kasugai (JP); Katsuhiro Sakurai, Nagoya (JP); Nobuya Yoshida, Toyota (JP)

(73) Assignees: Tokai Rubber Industries, Ltd., Komaki (JP); Toyota Jidosha Kabushiki Kaisha, Toyota (JP)

( * ) Notice: Subject to any disclaimer, the term of this patent is extended or adjusted under 35 U.S.C. 154(b) by 765 days.

(21) Appl. No.: 12/708,220

(22) Filed: Feb. 18, 2010

(65) Prior Publication Data

US 2010/0213652 A1 Aug. 26, 2010

(30) Foreign Application Priority Data

Feb. 23, 2009 (JP) .................................. 2009-038973

(51) Int. Cl.
    *F16F 7/00* (2006.01)
(52) U.S. Cl.
    USPC .................................. 267/141.2; 267/140.13
(58) Field of Classification Search
    USPC ......... 267/141, 141.2, 140.13, 140.5, 140.11, 267/152, 219, 35
    See application file for complete search history.

(56) References Cited

U.S. PATENT DOCUMENTS

| | | | |
|---|---|---|---|
| 4,679,778 A | 7/1987 | Tabata et al. | |
| 5,386,973 A * | 2/1995 | Brenner et al. | 267/140.13 |
| 6,923,435 B2 * | 8/2005 | Pizanti et al. | 267/140.13 |
| 7,025,341 B2 | 4/2006 | Ichikawa et al. | |
| 7,210,674 B2 | 5/2007 | Maeno et al. | |
| 8,011,644 B2 * | 9/2011 | Saito et al. | 267/140.13 |
| 8,177,201 B2 * | 5/2012 | Goudie | 267/140.13 |
| 2007/0013115 A1 | 1/2007 | Katagiri et al. | |
| 2008/0284075 A1 * | 11/2008 | Saito et al. | 267/140.13 |

FOREIGN PATENT DOCUMENTS

| | | |
|---|---|---|
| DE | 3502539 A1 | 8/1985 |
| JP | A-1-229132 | 9/1989 |
| JP | A-09-144805 | 6/1997 |
| JP | B2-3035233 | 4/2000 |
| JP | A-2002-39258 | 2/2002 |
| JP | A-2004-69005 | 3/2004 |
| JP | A-2007-255584 | 10/2007 |
| JP | A-2008-248967 | 10/2008 |

OTHER PUBLICATIONS

Extended European Search Report issued in European Patent Application No. 10001781.3 dated May 30, 2011.
Feb. 1, 2013 Office Action issued in Japanese Patent Application No. 2009-038973 (with partial English Translation).

* cited by examiner

*Primary Examiner* — Melanie Torres Williams
(74) *Attorney, Agent, or Firm* — Oliff & Berridge, PLC

(57) ABSTRACT

A fluid-filled vibration damping device including: a pressure-receiving chamber and an equilibrium chamber disposed on either side of a partition plate, while being connected through a first orifice passage; a moveable film arranged to either a pressure-receiving chamber side or an equilibrium chamber side of the partition plate while being spaced away therefrom to define therebetween an intermediate chamber; a second orifice passage connecting the intermediate chamber and one of the pressure-receiving and the equilibrium chambers while being tuned to higher frequency than the first orifice passage; and a flow straightening plate arranged in opposition to the moveable film at least at one of the intermediate chamber side and an opposite side thereof, the flow straightening plate having a plurality of flow straightening apertures opening towards the moveable film and furnished with a flow limiting member.

4 Claims, 4 Drawing Sheets

FLUID-FILLED VIBRATION DAMPING DEVICE

INCORPORATED BY REFERENCE

The disclosure of Japanese Patent Application No. 2009-038973 filed on Feb. 23, 2009 including the specification, drawings and abstract is incorporated herein by reference in its entirety.

BACKGROUND OF THE INVENTION

1. Field of the Invention

The present invention pertains to a vibration damping device adapted for example for use in an automotive engine mount and relates in particular to a fluid-filled vibration damping device adapted to utilize vibration damping effect on the basis of flow action of a non-compressible fluid which has been sealed inside.

2. Description of the Related Art

Fluid-filled vibration damping devices designed for example for application in automotive engine mounts represent one type of vibration damping device known in the past. Such fluid-filled vibration damping devices are typically constructed by elastically linking through a main rubber elastic body a first mounting member that has been mounted onto a first component (a power unit etc.) making up a vibrating system and a second mounting member that has been mounted onto another component (a vehicle body etc.) making up the vibrating system. Additionally, in the interior of the fluid-filled vibration damping device, there is formed a pressure-receiving chamber whose wall is partially defined by the main rubber elastic body and an equilibrium chamber whose wall is partially defined by a flexible film, the pressure-receiving chamber and the equilibrium chamber being filled with a non-compressible fluid, and the pressure-receiving chamber and the equilibrium chamber communicating with one another through an orifice passage. At times of vibration input, relative pressure fluctuations of the pressure-receiving chamber and the equilibrium chamber will give rise to fluid flow through the orifice passage, producing vibration damping effect on the basis of flow action of the fluid.

In such fluid-filled vibration damping devices, the orifice passage is pre-tuned to the frequency of the particular type of vibration targeted for damping, and produces excellent vibration damping effect against vibration having this tuning frequency. On the other hand, it has proven difficult to produce effective vibration damping effect against vibration of frequencies different from the tuning frequency of the orifice passage.

There has accordingly been proposed inter alia in US-A-2007-0013115 a structure in which a first orifice passage is formed connecting the pressure-receiving chamber and the equilibrium chamber, an intermediate chamber is formed in the interior of a partition member that separates the pressure-receiving chamber and the equilibrium chamber, and a second orifice passage is formed connecting the pressure-receiving chamber with the intermediate chamber. With such a structure, by tuning the second orifice passage to a higher frequency than the first orifice passage for example, it is possible to obtain vibration damping effect against vibration of multiple different frequencies.

In the construction disclosed in US-A-2007-0013115, a moveable rubber film is arranged in the dividing wall section between the pressure-receiving chamber and the intermediate chamber which lie on the flow path of the second orifice passage, and at times of input of low-frequency, large-amplitude vibration, fluid flow through the second orifice passage, which has been tuned to high frequency, will be limited by the elasticity of this moveable rubber film. As a result, fluid flow will be effectively produced through the first orifice passage, which has greater flow friction than the second orifice passage. At times of input of high-frequency, small-amplitude vibration, liquid pressure of the pressure-receiving chamber will be transmitted to the intermediate chamber through minute deformation of the moveable rubber film so as to give rise to fluid flow through the second orifice passage between the pressure-receiving chamber and the intermediate chamber.

However, with the fluid-filled vibration damping device disclosed in US-A-2007-0013115, because the moveable rubber film is arranged on the flow path of the second orifice passage, there is a risk that fluid flow through the second orifice passage will be limited by the elasticity of the moveable rubber film even at times of input of vibration in the frequency range to which the second orifice passage has been tuned, thus preventing fluid flow through the second orifice passage from giving rise to sufficient vibration damping effect.

Moreover, recent more compact vehicle sizes impose severe limitations on installation space for fluid-filled vibration damping devices, and in association there has arisen stronger demand for more compact fluid-filled vibration damping devices. However, it has been shown that as fluid-filled vibration damping devices are made more compact in size, the vibration damping effect afforded by the second orifice passage may be diminished further, and may prove insufficient in some instances.

SUMMARY OF THE INVENTION

It is therefore one object of this invention to provide a fluid-filled vibration damping device of novel construction able to more effectively produce vibration damping action or effect based on fluid flow through the second orifice passage.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

One aspect of the present invention provides a fluid-filled vibration damping device comprising: a first mounting member; a second mounting member; a main rubber elastic body elastically connecting the first and second mounting members; a partition plate supported by the second mounting member; a pressure-receiving chamber disposed on one side of the partition plate and filled with a non-compressible fluid; an equilibrium chamber disposed on another side of the partition plate and filled with the non-compressible fluid; a first orifice passage which connects the pressure-receiving chamber and the equilibrium chamber; a moveable film arranged to either a pressure-receiving chamber side or an equilibrium chamber side of the partition plate and being spaced a prescribed distance away therefrom to define an intermediate chamber situated between opposed faces of the partition plate and the moveable film; a second orifice passage which connects the intermediate chamber and one of the pressure-receiving chamber and the equilibrium chamber which are separated from the intermediate chamber by the partition plate, the second orifice passage being tuned to higher frequency than the first orifice passage; and a flow straightening plate being arranged in opposition to the moveable film from at least one of the intermediate chamber side and an opposite side thereof, the flow straightening plate having a plurality of flow straightening apertures formed therein opening towards the moveable film and being furnished with a flow limiting member adapted to limit fluid flow level through the flow straightening apertures.

With the fluid-filled vibration damping device constructed according to the present invention, fluid flow through the second orifice passage is generated effectively through relative pressure fluctuations of the pressure-receiving chamber and the equilibrium chamber so as to produce the sufficient intended vibration damping effect based on flow action of the fluid. This has been demonstrated through measurements of vibration capability carried out through tests showing that it is possible to attain vibration damping characteristics suitable for an engine mount, for example.

While the reasons why fluid flow is generated effectively through the second orifice passage to produce exceptional vibration damping capabilities are not fully understood, it is not an object per se of the present invention to elucidate these reasons. However, the inventors infer by way of possible explanation that the observed improvement in vibration damping capabilities may be due to reasons such as the following.

Specifically, it is thought that by providing a flow straightening plate having flow straightening apertures, liquid pressure in at least one of the pressure-receiving chamber and the equilibrium chamber will be exerted on the moveable film in its thickness direction in a condition of having been flow straightened by the flow straightening apertures which open towards the moveable film. Elastic deformation of the moveable film will be produced efficiently thereby, permitting sufficient change in volume of the intermediate chamber through the liquid pressure transmitting action of the moveable film. It is postulated that as a result, fluid flow will arise efficiently through the second orifice passage to effectively produce vibration damping effect based on flow action of the fluid.

It is also thought that by forming multiple flow straightening apertures, liquid pressure exerted on the moveable film through the flow straightening apertures will act on the moveable film over a wide area. Thus, the moveable film will undergo elastic deformation in a consistent manner over a wide area through the action of liquid pressure on the moveable film, so that liquid pressure transmitting action is efficiently produced through elastic deformation, of the moveable film. It is postulated that as a result, vibration damping effect will be advantageously produced by fluid flow through the second orifice passage, so that enhanced vibration damping capabilities may be attained.

It is additionally thought that because liquid pressure is exerted on the moveable film through a plurality of flow straightening apertures, the liquid pressure will act on the moveable film in the same phase over a wide area. The moveable film will therefore experience deformation towards the same side in its thickness direction over a wide area, ensuring a large effective piston surface area through deformation of the moveable film. It is postulated that as a result, vibration damping effect based on fluid flow through the second orifice passage will be produced effectively.

Meanwhile, by providing flow limiting member adapted to limit the level of flow of fluid flowing through the flow straightening apertures, at times of input of vibration in the frequency range to which the first orifice passage has been tuned, the flow of fluid through the flow straightening apertures will be limited, thereby preventing liquid pressure of the pressure-receiving chamber from escaping to the equilibrium chamber through the second orifice passage, so that vibration damping effect may be produced effectively by fluid flow through the first orifice passage.

Also, because fluid flow arises efficiently through the second orifice passage, a fluid-filled vibration damping device having exceptional vibration damping effect can be realized with lighter weight and more compact size.

In a preferred mode of the fluid-filled vibration damping device constructed according to the present invention, the flow straightening plate is situated to the opposite side of the moveable film from the partition plate, with the intermediate chamber being defined between the partition plate and the moveable film, and with an end of the second orifice passage opening onto a peripheral wall of the intermediate chamber.

By designing the second orifice passage so that an end thereof opens onto the peripheral wall of the intermediate chamber in this way, the liquid pressure exerted on the moveable film at the face thereof lying to the opposite side from that where the flow straightening plate is situated can be prevented from being exerted in localized fashion on the moveable film from the opening at the end of the second orifice passage. For this reason, the moveable film can be induced to undergo elastic deformation over a wider range, so that fluid flow can be efficiently assured through the second orifice passage.

Additionally, because the moveable film is situated between the partition plate and the flow straightening plate, relative pressure fluctuations arising in the pressure-receiving chamber and the equilibrium chamber when vibration is input will be exerted on the moveable film indirectly through the second orifice passage and the flow straightening apertures. For this reason, at times of input of vibration in the tuning frequency range of the first orifice passage, the flow of fluid through the flow straightening apertures will be limited by the flow limiting member, thereby preventing elastic deformation of the moveable film and preventing absorption of relative pressure differentials between the pressure-receiving chamber and the equilibrium chamber due to liquid pressure absorbing action resulting from elastic deformation of the moveable film. As a result, fluid flow can be generated efficiently through the first orifice passage, and the desired vibration damping effect can be effectively achieved.

In another possible mode of the fluid-filled vibration damping device constructed according to the present invention, the flow straightening plate is furnished with a passage-defining rubber member, the passage-defining rubber member having the flow straightening apertures formed therein; the flow limiting member comprises a protruding valve-like rubber protrusion formed at least at one opening of the flow straightening aperture; the valve-like rubber protrusion in an initial configuration thereof is positioned away from the opening of the flow straightening aperture so that the flow straightening aperture is maintained in a communicating state; and in response to relative pressure fluctuations of the pressure-receiving chamber and the equilibrium chamber the valve-like rubber protrusion undergoes elastic deformation, and moves into proximity with the opening of the flow straightening aperture and blocks the flow straightening aperture.

According to this mode, a valve body and spring means which together constitute flow limiting member for the flow straightening aperture are integrally formed by a valve-like rubber protrusion made of a rubber elastic body, whereby noise occurring when the flow straightening aperture is blocked can be reduced. By forming the valve body from a rubber elastic body, upon coming into contact against the opening of the flow straightening aperture, the energy resulting from contact will be attenuated through energy loss produced by elastic deformation of the valve body; and by forming the spring means which supports the valve body from a rubber elastic body, the actuation speed of the valve body will be reduced through energy loss (attenuation) produced by elastic deformation of the spring means, thereby minimizing the quantity of motion at contact.

In a preferred mode of the fluid-filled vibration damping device constructed according to the present invention, wherein the plurality of flow straightening apertures include a plurality ones formed at equidistant intervals along a circumference about a center of the flow straightening plate.

According to this mode, liquid pressure exerted on the moveable film can be dispersed over a wider range. Elastic deformation of the moveable film can be brought about more advantageously thereby, and vibration damping effect produced on the basis of fluid flow through the second orifice passage can be attained more effectively.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
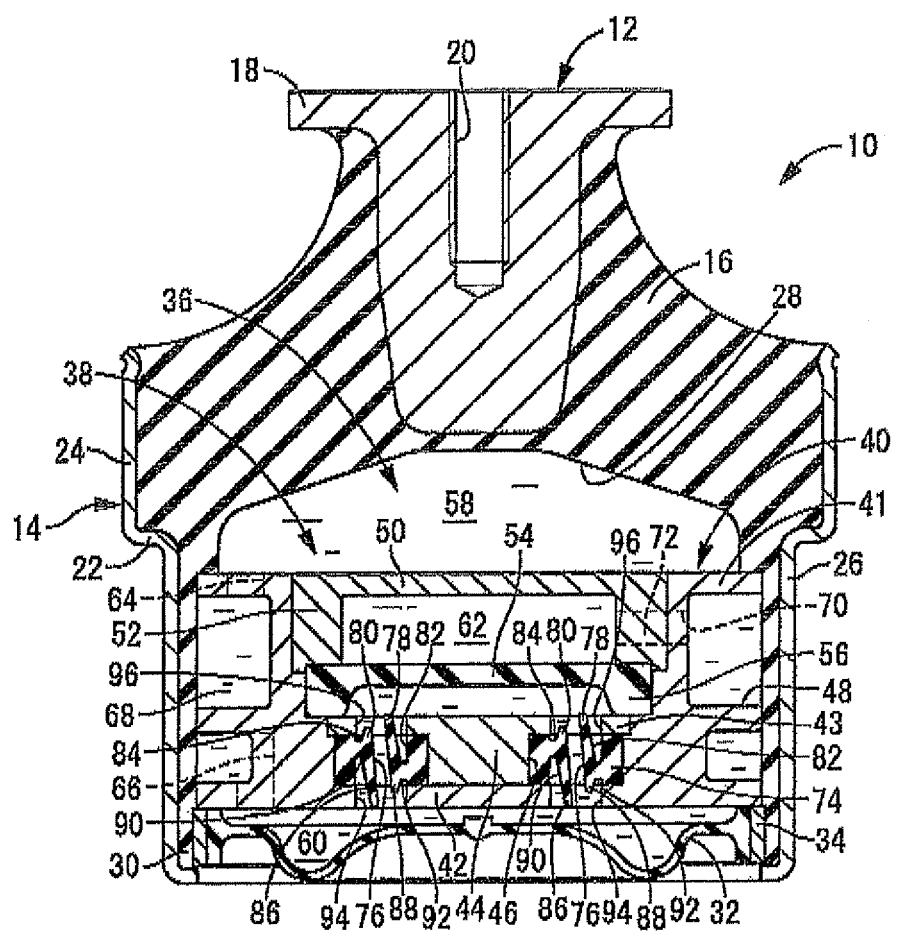
FIG. 1 is an elevational view in axial or vertical cross section of a fluid-filled vibration damping device in the form of an engine mount, which is constructed according to a first embodiment of the invention.

First, FIG. 1 depicts an automotive engine mount 10 described as a first embodiment of the fluid-filled vibration damping device constructed according to the present invention. The engine mount 10 has a construction in which a first mounting member 12 of metal and a second mounting member 14 of metal are elastically connected by a main rubber elastic body 16. The first mounting member 12 is mounted onto a power unit (not shown), while the second mounting member 14 is mounted onto the vehicle body (not shown), whereby the engine mount 10 provides vibration-damped linkage of the power unit and the vehicle body. In the following description, as a general rule, the vertical direction refers to the axial direction, which is the vertical direction in FIG. 1.

More specifically, the first mounting member 12 is a high rigidity member made of metal or the like having generally circular post shape. A flange portion 18 which flares peripherally outward is integrally formed at the top end of the first mounting member 12. In the first mounting member 12 there is additionally formed a bolt hole 20 that opens onto the upper end face and extends in the vertical direction along the center axis. The first mounting member 12 is designed to attach to the power unit with a mounting bolt (not shown) which is threaded through the bolt hole 20.

Meanwhile, like the first mounting member 12, the second mounting member 14 is a high rigidity member having thin-walled, large-diameter, generally circular cylinder shape. At its axially upper side situated to one side of a step portion 22 formed in the axially medial section, the second mounting member 14 constitutes a large-diameter cylindrical part 24, while its lower end constitutes a small-diameter cylindrical part 26. The second mounting member 14 is mounted onto the vehicle body via a bracket, not shown.

The first mounting member 12 and the second mounting member 14 are elastically connected by a main rubber elastic body 16, with the first mounting member 12 positioned coaxially with the second mounting member 14 and the lower end part of the first mounting member 12 slipped into the upper opening of the second mounting member 14. The main rubber elastic body 16 has thick-walled, large-diameter, generally truncated conical shape into whose small-diameter end part the first mounting member 12 has been inserted and vulcanization bonded; and whose large-diameter end part has been juxtaposed against and vulcanization bonded to the step portion 22 and the large-diameter cylindrical part 24 of the second mounting member 14. In the present embodiment, the main rubber elastic body 16 takes the form of an integrally vulcanization molded component incorporating the first mounting member 12 and the second mounting member 14.

A large-diameter recess 28 of inverted bowl shape is formed opening onto the large-diameter end face of the main rubber elastic body 16. Additionally, a seal rubber layer 30 provided as a cushioning rubber layer has been integrally formed at the outside peripheral edge of the large-diameter end face of the main rubber elastic body 16, and extends downward to sheathe the inside peripheral face of the small-diameter cylindrical part 26 of the second mounting member 14.

A flexible film 32 is attached at the lower end of the second mounting member 14. The flexible film 32 is formed by a thin rubber film having generally circular disk shape with ample slack in the axial direction. An annular fastener fitting 34 has been vulcanization bonded to the outside peripheral edge part of the flexible film 32. The fastener fitting 34 is slipped inside the lower end of the small-diameter cylindrical part 26 of the second mounting member 14 and is secured fitting into the second mounting member 14 via the seal rubber layer 30.

The upper opening of the second mounting member 14 is thereby provided closure by the main rubber elastic body 16 while the lower opening is provided closure by the flexible film 32 to define a fluid chamber 36 situated between the axially opposed faces of the main rubber elastic body 16 and the flexible film 32. This fluid chamber 36 is isolated from the outside and is filled with a non-compressible fluid. While no particular limitation is imposed as to the non-compressible fluid, favorable examples are water, alkylene glycols, polyalkylene glycols, silicone oil, and mixtures of these. In terms of advantageously achieving vibration damping based on flow action of the fluid, a low-viscosity fluid having viscosity of 0.1 Pa·s or lower is especially preferred.

A partition member 38 is arranged in the fluid chamber 36 and is supported by the second mounting member 14. The partition member 38 has a thick, generally circular disk shape on the whole, and includes a partition member body 40.

The partition member body 40 has a generally bottomed, circular cylinder shape including a cylindrical part 41 and a base wall part 42, and is made of metal, rigid synthetic resin, or the like. A cover member 43 is juxtaposed from above against the base wall part 42 of the partition member body 40. This cover member 43 has generally circular disk shape with an integrally formed protruding part 44 of circular post form protruding downward in its diametrical center section. The cover member 43 is fitted through the center bore of the cylindrical part 41 of the partition member body 40 and is positioned with the protruding part 44 abutting the base wall part 42 of the partition member body 40 and defining a housing zone 46 of annular shape encircling the protruding part 44. A circumferential groove 48 is formed extending for a prescribed distance just short of twice around the circumference is formed opening onto the outside peripheral face of the cylindrical part 41 of the partition member body 40.

A partition plate 50 has also been installed in the partition member body 40. The partition plate 50 is made of rigid material comparable to the partition member body 40, and as a whole has generally circular disk shape. At the outside peripheral edge of the partition plate 50 an integrally formed protruding support part 52 of annular shape protrudes towards the bottom. The partition plate 50 has been slipped into the center bore of the partition member body 40 and is supported at its upper end section by the cylindrical part 41 of the partition member body 40. The upper opening of the center bore of the partition member body 40 is thereby closed off by the partition plate 50. In the present embodiment, a step has been formed at the upper end an the inside peripheral face of the partition member body 40, and the partition plate 50 is positioned in the axial direction with respect to the partition member body 40 by virtue of the bottom face of the protruding support part 52 of the partition plate 50 being disposed in abutment against this step.

A moveable film 54 is disposed between the axially opposed faces of the partition plate 50 and the base wall part 42 of the partition member body 40. The moveable film 54 is a rubber elastic body having generally circular disk shape whose outside peripheral edge part constitutes a thick-walled portion 56 that protrudes downward along the entire circumference. The moveable film 54 is arranged with the lower face of its thick-walled portion 56 juxtaposed against the base wall part 42 of the partition member body 40, and the upper face of the thick-walled portion 56 juxtaposed against the protruding support part 52 of the partition plate 50, so as to be supported clasped in the axial direction between the partition member body 40 and the partition plate 50. The moveable film 54 is arranged with its diametrically center section, which is away to the inside peripheral side from the thick-walled portion 56, positioned midway between the cover member 43 and the partition plate 50 and spaced a prescribed distance away from each.

The partition member 38 having the above construction has been arranged inside the fluid chamber 36 so as to extend in the axis-perpendicular direction, with the cylindrical part 41 of the partition member body 40 elastically fitted with respect to the second mounting member 14 via the seal rubber layer 30. The fluid chamber 36 is thereby bifurcated top and bottom to either side of the partition member 38 inclusive of the partition plate 50, and a pressure-receiving chamber 58 whose wall is partly constituted by the main rubber elastic body 16 and gives rise to pressure fluctuations is defined to the upper side of the partition member 38. Meanwhile, to the lower side of the partition member 38 there is defined an equilibrium chamber 60 whose wall is partly constituted by the flexible film 32, and adapted to readily permit changes in volume.

In the interior of the partition member 38, an intermediate chamber 62 which is separated from the pressure-receiving chamber 58 and the equilibrium chamber 60 is defined between the axially opposed faces of the partition plate 50 and the moveable film 54. This intermediate chamber 62 is defined between the pressure-receiving chamber 58 and the equilibrium chamber 60 in the axial direction, and is separated from the pressure-receiving chamber 58 by the partition plate 50 while being separated from the equilibrium chamber 60 by the moveable film 54. Like the pressure-receiving chamber 58 and the equilibrium chamber 60, the intermediate chamber 62 is filled with a non-compressible fluid.

The partition member 38 is supported by the second mounting member 14 through the agency of the seal rubber layer 30, thereby forming a tunnel-like passage defined by the outside peripheral opening of the circumferential groove 48 being covered by the second mounting member 14 and extending in the circumferential direction. A first lengthwise end of the circumferential groove 48 communicates with the pressure-receiving chamber 58 through an upper side communication hole 64, while the other end communicates with the equilibrium chamber 60 through a lower side communication hole 66. There is thereby formed in the partition member body 40 a first orifice passage 68 provided as a low-frequency orifice passage which connects the pressure-receiving chamber 58 and the equilibrium chamber 60 to one another. In the present embodiment, the first orifice passage 68 has been tuned to low frequency on the order of 10 Hz corresponding to engine shake. According to the present embodiment, by forming the first orifice passage 68 so as to extend in the circumferential direction, extended passage length of the first orifice passage 68 can be efficiently assured, thus facilitating tuning to low frequency.

Additionally, in the medial section of the first orifice passage 68 as viewed in the lengthwise direction of the passage, a middle communication hole 70 has been formed passing in the diametrical direction through the wall on the inside peripheral side. This middle communication hole 70 passes in the axis-perpendicular direction through the juxtaposed sections of the cylindrical part 41 of the partition member body 40 and the protruding support part 52 of the partition plate 50, with the end thereof on the outside peripheral side opening into the side wall of the first orifice passage 68 and the end on the inside peripheral side opening into the peripheral wall of the intermediate chamber 62.

The pressure-receiving chamber 58 and the intermediate chamber 62 have been designed to communicate with one another utilizing the middle communication hole 70 and part of the first orifice passage 68 on the pressure-receiving chamber 58 side thereof, thereby defining a second orifice passage 72 provided as a high-frequency orifice passage. The second orifice passage 72 is tuned to higher frequency than the first orifice passage 68; in the present embodiment, it has been tuned to high frequency on the order of 15 to 45 Hz corresponding to idling vibration. The tuning of the first and second orifice passages 68, 72 can be modified through adjustment of the ratio (A/L) of passage cross sectional area (A) to passage length (L).

Further, in the present embodiment, the partition member body 40 is elastically supported with respect to the small-diameter cylindrical part 26 through the agency of the seal rubber layer 30. A vibrating subsystem (dynamic damper) that includes the partition member 38 as the mass system and the seal rubber layer 30 as the spring system is constituted thereby. Here, the natural frequency of the partition member 38 has been tuned to a higher frequency range than the tuning frequency of the second orifice passage 72. While it is possible for the natural frequency of the partition member 38 to be tuned through modification of the material or shape of the partition member 38 and/or the seal rubber layer 30, in preferred practice this will be carried out with the engine mount 10 installed on the power unit.

A passage-defining rubber member 74 has been disposed on the base wall part 42 of the partition member 38. The passage-defining rubber member 74 is a rubber elastic body of generally annular shape arranged externally fitting onto the cover member 43 while accommodated in the housing zone 46 which has been formed between the cover member 43 and the base wall part 42 of the partition member 38. In the present embodiment, the cover member 43 and the base wall part 42 of the partition member body 40, together with the passage-defining rubber member 74, constitute a flow straightening plate, this flow straightening plate being positioned to the opposite side of the moveable film 54 from the intermediate chamber 62 so that the equilibrium chamber 60 and the intermediate chamber 62 are partitioned by the flow straightening plate.

A pair of flow straightening apertures 76, 76 of elongated slit form have been formed in areas situated in opposition along a diametrical axis in the passage-defining rubber member 74. The flow straightening apertures 76 have been formed so as to pass through the passage-defining rubber member 74 in the thickness direction while sloping in the direction of opposition of the pair of flow straightening apertures 76, 76. Additionally, the flow straightening apertures 76 have been formed so as to extend along linear paths in the axis-perpendicular direction orthogonal to the diametrical axis lying in the direction of opposition of the pair of flow straightening apertures 76, 76. In the present embodiment, the pair of flow straightening apertures 76, 76 slope at mutually equal angles of slope as they pass through the passage-defining rubber member 74. The length of the flow straightening apertures 76 is such that they do not reach the outside peripheral face of the passage-defining rubber member 74. In the present embodiment, the length dimension of the flow straightening apertures 76 in the axis-perpendicular direction is smaller than the inside diameter of the passage-defining rubber member 74.

To one side in the width direction crossing each flow straightening aperture 76 (i.e. an axis lying in the axis-perpendicular direction of opposition of the pair of flow straightening apertures 76, 76) in the passage-defining rubber member 74 there is integrally formed upper valve-like rubber protrusions 78 that protrude towards the top and are served as a flow limiting member. Each upper valve-like rubber protrusion 78 has been formed so as to protrude towards the top from the edge of the opening of the flow straightening aperture 76, and takes the form of a plate extending along the flow straightening aperture 76. In the present embodiment, the upper valve-like rubber protrusion 78 becomes progressively thinner towards the top, namely its protruding distal edge side. Also, in the present embodiment, the end face of the upper valve-like rubber protrusion 78 on the flow straightening aperture 76 side thereof is constituted as a sloping flat face that connects smoothly without unevenness to the inside face at one widthwise side of the flow straightening aperture 76 (in FIG. 1, the right side); and the principal axis of elasticity, which extends in the direction of protrusion of the upper valve-like rubber protrusion 78, inclines to the flow straightening aperture 76 side with respect to the axial direction of the engine mount 10 as it moves closer towards the protruding distal end.

Each flow straightening aperture 76 in the passage-defining rubber member 74 has an upwardly protruding upper cushioning protrusion 80 that has been integrally formed at the side thereof opposite from the upper valve-like rubber protrusion 78. Each upper cushioning protrusion 80 has been formed so as to protrude towards the top from the edge of the opening of the flow straightening aperture 76, and extends along the flow straightening aperture 76. In the present embodiment, the upper cushioning protrusions 80, like the upper valve-like rubber protrusions 78, become progressively thinner towards the top, namely their protruding distal edge side. The upper cushioning protrusions 80 are sufficiently shorter in protruding height than the upper valve-like rubber protrusions 78, while their plate thickness dimension is the same as or slightly smaller than that of the upper valve-like rubber protrusions 78, making them more resistant to elastic deformation than the upper valve-like rubber protrusions 78. In the present embodiment, the protruding distal edge part of the upper cushioning protrusions 80, at least at the end face on the flow straightening aperture 76 side thereof, takes the form of a curving face having arcuate shape in longitudinal cross section.

On the upper face of the passage-defining rubber member 74 there have been formed first upper recessed grooves 82 and second upper recessed grooves 84. The first and second upper recessed grooves 82, 84 are recessed grooves that open onto the upper face of the passage-defining rubber member 74 and extend in the lengthwise direction of the flow straightening apertures 76. The first upper recessed grooves 82 have been formed to the opposite side of the upper valve-like rubber protrusions 78 from the flow straightening apertures 76, while the second upper recessed grooves 84 have been formed to the opposite side of the upper cushioning protrusions 80 from the flow straightening apertures 76. Additionally, the first upper recessed grooves 82 have greater depth dimension than the second upper recessed grooves 84, thereby minimizing the height of the upper valve-like rubber protrusion 78 in the section thereof that protrudes up from the upper face of the passage-defining rubber member 74, while ensuring that the upper valve-like rubber protrusion 78 has an axial dimension sufficiently larger than the axial dimension of the upper cushioning protrusion 80.

Meanwhile, on the same side of the flow straightening apertures 76 as the upper cushioning protrusions 80 in the passage-defining rubber member 74 there have been integrally formed lower valve-like rubber protrusions 86 that protrude towards the bottom and are served as a flow limiting member. Each lower valve-like rubber protrusion 86 has been formed so as to protrude towards the bottom from the edge of the opening of the flow straightening aperture 76, and extends along the flow straightening aperture 76 with a cross-sectional profile corresponding to that of the upper valve-like rubber protrusions 78. In the present embodiment, the lower valve-like rubber protrusions 86 become progressively thinner towards the bottom, namely their protruding distal edge side. Also in the present embodiment, the end face of the lower valve-like rubber protrusion 86 on the flow straightening aperture 76 side thereof is constituted as a sloping flat face that connects smoothly without unevenness to the inside face at the other widthwise side of the flow straightening aperture 76 (in FIG. 1, the left side), and the principal axis of elasticity, which extends in the direction of protrusion of the lower valve-like rubber protrusion 86, inclines to the flow straightening aperture 76 side with respect to the axial direction of the engine mount 10 as it moves closer towards the protruding distal end. In the present embodiment, the principal axis of elasticity of the upper valve-like rubber protrusions 78 and the principal axis of elasticity of the lower valve-like rubber protrusions 86 extend approximately parallel to one another.

Further, on the opposite side of the flow straightening apertures 76 from the lower valve-like rubber protrusions 86 in the passage-defining rubber member 74, that is on the same side of the flow straightening apertures 76 as the upper valve-like rubber protrusions 78, there have been integrally formed lower cushioning protrusions 88 that protrude towards the bottom. Each lower cushioning protrusion 88 has been formed so as to protrude towards the bottom from the edge of the opening of the flow straightening aperture 76, and extends along the flow straightening aperture 76. In the present embodiment, the lower cushioning protrusions 88, like the lower valve-like rubber protrusions 86, have plate shape progressively thinner towards the bottom, namely the protruding distal edge side. The lower cushioning protrusions 88 are shorter in protruding height then the lower valve-like rubber protrusions 86, while their plate thickness dimension is the same as or slightly smaller than the that of the lower valve-like rubber protrusions 86, making them more resistant to elastic deformation than the lower valve-like rubber protrusions 86. In the present embodiment, the protruding distal edge part of the lower cushioning protrusions 88, at least at the end face on the flow straightening aperture 76 side thereof, takes the form of a curving face having arcuate shape in longitudinal cross section.

On the lower face of the passage-defining rubber member 74 there have been formed first lower recessed grooves 90 and second lower recessed grooves 92. The first and second lower recessed grooves 90, 92 are recessed grooves that open onto the lower face of the passage-defining rubber member 74 and extend in the lengthwise direction of the flow straightening apertures 76. The first lower recessed grooves 90 have been formed to the opposite side of the lower valve-like rubber protrusions 86 from the flow straightening apertures 76, while the second lower recessed grooves 92 have been formed to the opposite side of the lower cushioning protrusions 88 from the flow straightening apertures 76. Additionally, the first lower recessed grooves 90 have greater depth dimension than the second lower recessed grooves 92, thereby minimizing the height of the lower valve-like rubber protrusion 86 in the section thereof that protrudes from the lower face of the passage-defining rubber member 74, while ensuring that the axial dimension of the lower valve-like rubber protrusion 86 is sufficiently larger than the axial dimension of the lower cushioning protrusion 88.

The passage-defining rubber member 74 which has been constructed in this way is arranged accommodated within the housing zone 46 which has been formed between the base wall part 42 and the cover member 43 of the partition member body 40. The passage-defining rubber member 74 is then clasped between the base wall part 42 and the cover member 43 of the partition member body 40 and supported at its outside peripheral section, which is situated away from the flow straightening apertures 76, 76, the upper and lower valve-like rubber protrusions 78, 86, the upper and lower cushioning protrusions 80, 88, and the upper and lower recessed grooves 82, 84, 90, 92.

In the present embodiment, the passage-defining rubber member 74 is situated at a location in proximity to the vehicle body in the axial direction, with the center of the passage-defining rubber member 74 in the direction of plate thickness being separated by only a small distance in the axial direction from the joining face of the second mounting member 14 against the vehicle body. In the present embodiment in particular, the installation location of the passage-defining rubber member 74 in the axial direction is offset to a significant degree towards the vehicle body side (the lower side in FIG. 1) from the axial center of the second mounting member 14.

Also, in the present embodiment, the partition plate 50, the moveable film 54, and the passage-defining rubber member 74 have been arranged in that order from the pressure-receiving chamber 58 side towards the equilibrium chamber 60 side, so that the passage-defining rubber member 74 is situated closer to the vehicle body side then the partition plate 50 and the moveable film 54.

Lower through-holes 94 of slit form passing through the lower wall part of the housing zone 46 have been formed in the base wall part 42 of the partition member body 40. Meanwhile, upper through-holes 96 of slit form passing through the upper wall part of the housing zone 46 have been formed in the outside peripheral section of the cover member 43. The housing zone 46 is thereby connected respectively to the intermediate chamber 62 and to the equilibrium chamber 60, with the lower openings of the flow straightening apertures 76 connecting through the lower through-holes 94 to the equilibrium chamber 60 and with the upper openings of the flow straightening apertures 76 connecting through the upper through-holes 96 to a zone situated between the opposed faces of the moveable film 54 and the cover member 43, and opening towards the moveable film 54.

Further, the upper valve-like rubber protrusions 78 and the upper cushioning protrusions 80 have been inserted into the upper through-holes 96 and protrude out towards the pressure-receiving chamber 58 (intermediate chamber 62) side, while the lower valve-like rubber protrusions 86 and the lower cushioning protrusions 88 have been inserted into the lower through-holes 94 and protrude out towards the equilibrium chamber 60 side. With the engine mount 10 in the stationary state, the upper valve-like rubber protrusions 78 and the lower valve-like rubber protrusions 86 which have been positioned at the openings of the flow straightening apertures 76, owing to the intrinsic elastic force of these elements, function to maintain the openings of the flow straightening apertures 76 in the communicating state. At times of input of low-frequency, large-amplitude vibration corresponding to the tuning frequency of the first orifice passage 68, relative pressure fluctuations arising between the pressure-receiving chamber 58 (intermediate chamber 62) and the equilibrium chamber 60 will bring about elastic deformation tending to induce distortion of the upper valve-like rubber protrusions 78 and the lower valve-like rubber protrusions 86 towards the flow straightening apertures 76. The openings of the flow straightening apertures 76 will thereby become covered by the upper valve-like rubber protrusions 78 or the lower valve-like rubber protrusions 86 so that the flow straightening apertures 76 are switched to the blocked state. That is, in the present embodiment, the upper valve-like rubber protrusions 78 and the lower valve-like rubber protrusions 86 function as valves for switching the flow straightening apertures 76 between the communicating state and the blocked state, while at the same time these elements, owing to their intrinsic elastic force, will in their initial configuration be positioned away from the openings of the flow straightening apertures 76 and function as spring means for maintaining the flow straightening apertures 76 in the communicating state while in the stationary state.

The inside peripheral faces of the upper through-holes 96 constitute first restricting abutment parts adapted to limit distortional deformation of the upper valve-like rubber protrusions 78 towards the opposite direction from the flow straightening apertures 76, while the inside peripheral faces of the lower through-holes 94 constitute second restricting abutment parts adapted to limit distortional deformation of the lower valve-like rubber protrusions 86 towards the opposite direction from the flow straightening apertures 76. Additionally, distortion of the upper cushioning protrusions 80 towards the opposite direction from the flow straightening apertures 76 will be limited by the inside peripheral faces of the upper through-holes 96, while distortion of the lower cushioning protrusions 88 towards the opposite direction from the flow straightening apertures 76 will be limited by the inside peripheral faces of the lower through-holes 94.

In the present embodiment, the upper valve-like rubber protrusions 78 have been designed to undergo elastic deformation and come into abutment against the upper cushioning protrusions 80. Meanwhile, the lower valve-like rubber protrusions 86 have been designed to undergo elastic deformation and come into abutment against the lower cushioning protrusions 88. In other words, the upper and lower cushioning protrusions 80, 88 have been disposed in zones that overlap the upper and lower valve-like rubber protrusions 78, 86 viewed in axial projection when the flow straightening apertures 76 are blocked.

With the engine mount 10 according to the present embodiment installed in a vehicle, when low-frequency, large-amplitude vibration corresponding to engine shake is input, fluid flow between the pressure-receiving chamber 58 and the equilibrium chamber 60 will arise through the first orifice passage 68, and the intended vibration damping (high attenuating action) will be produced on the basis of flow action, such as resonance action, of the fluid.

In the present embodiment in particular, at times of input of low-frequency, large-amplitude vibration, on the basis of relative pressure fluctuations arising between the pressure-receiving chamber 58 and the equilibrium chamber 50 the flow straightening apertures 76 will be switched to the blocked state through elastic deformation of either the upper or lower valve-like rubber protrusions 78, 86 which have been provided to the passage-defining rubber member 74. This will prevent transmission of liquid pressure from the intermediate chamber 62 to the equilibrium chamber 60, thereby ensuring that the second orifice passage 72 is substantially blocked so that fluid flow may take place efficiently through the first orifice passage 68 and advantageously produce the intended vibration damping effect.

Figure 2:
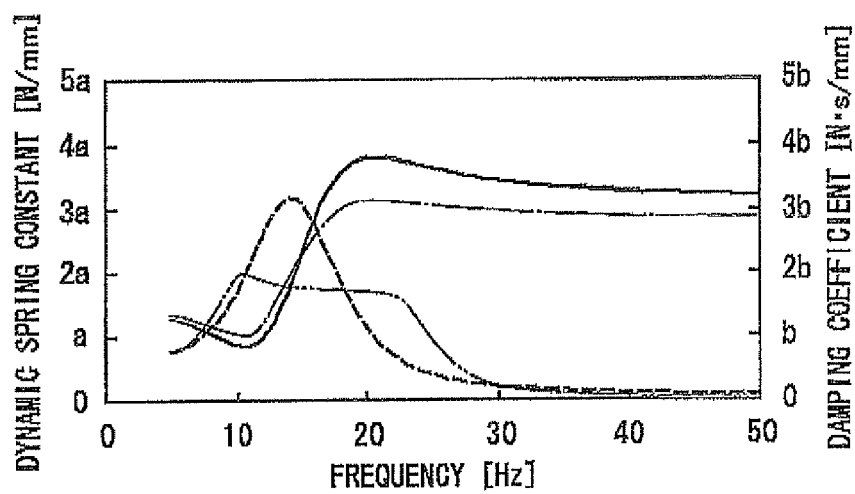
FIG. 2 is a graph demonstrating vibration damping characteristics of the engine mount of FIG. 1 observed upon input of large-amplitude vibration.

FIG. 2 depicts vibration damping characteristics observed when large-amplitude vibration was input to the engine mount 10. Specifically, according to FIG. 2, as compared to a construction (indicated by a thin single-dot and dash line and a thin double-dot and dash line) in which the partition plate body is composed of the cylindrical part 41 only, with the passage-defining rubber member 74 omitted (Comparative Example), a construction (indicated by a solid line and a broken line) according to the present embodiment (Example) may be clearly seen to exhibit outstanding attenuating action in a frequency range corresponding to engine shake, as well as outstanding low spring action in a frequency range corresponding to idling vibration. In FIG. 2, the dynamic spring constant of the Example is indicated by the solid line, while the damping coefficient of the Example is indicated by the broken line; and the dynamic spring constant of the Comparative Example is indicated by the single-dot and dash line, while the damping coefficient of the Comparative Example is indicated by the double-dot and dash line.

On the other hand, at times of input of midrange frequency vibration corresponding to idling vibration, the upper and lower valve-like rubber protrusions 78, 86 will be released from their deformed state and will function to maintain the flow straightening apertures 76 in the communicating state. Change in volume of the intermediate chamber 62 through elastic deformation of the moveable film 54 will be permitted thereby so that fluid flow may arise between the pressure-receiving chamber 58 and the intermediate chamber 62 through the second orifice passage 72. As a result, the intended vibration damping effect (low spring action) will be produced on the basis of flow action of the fluid. Also, at times of input of midrange frequency vibration, because the first orifice passage 68 is substantially blocked due to antiresonance, fluid flow through the second orifice passage 72 will be produced efficiently.

One advantage of the present embodiment is that an acceptable level of fluid flow through the second orifice passage 72 is assured during input of such relatively small-amplitude vibration of midrange frequency. The following may be postulated as a possible reason why an acceptable level of fluid flow through the second orifice passage 72 may be advantageously assured.

Specifically, in the present embodiment, a flow straightening plate has been positioned between the moveable film 54 and the equilibrium chamber 60, and with the flow straightening apertures 76 in the communicating state, liquid pressure at the equilibrium chamber 60 side will be exerted on the moveable film 54 hi a condition of having been straightened to approximately the axial direction by the flow straightening action of the flow straightening apertures 76. As a result, elastic deformation of the moveable film 54 due to the action of liquid pressure will be produced efficiently in the film thickness direction, advantageously giving rise to liquid pressure-transmitting action between the intermediate chamber 62 and the equilibrium chamber 60, resulting from minute deformations of the moveable film 54. For this reason, relative pressure fluctuations between the pressure-receiving chamber 58 and the intermediate chamber 62 will be produced effectively, and fluid flow through the second orifice passage 72 will take place consistently and efficiently so that the intended vibration damping effect is produced very effectively.

For this reason, a sufficient level of fluid flow through the second orifice passage 72 may be assured, and it will be possible to design the fluid chamber 36 inclusive of the intermediate chamber 62 to have relatively small volume, while also attaining the intended vibration damping performance to a sufficient extent. The engine mount 10 can accordingly be made more compact in size by virtue of the smaller design of the intermediate chamber 62.

Moreover, because a plurality of flow straightening apertures 76 have been formed in the passage-defining rubber member 74, liquid pressure will be exerted over a large surface area of the moveable film 54. Thus, the moveable film 54 will undergo elastic deformation over a wide area so that liquid pressure transmitting action is efficiently produced. Thus, fluid flow through the second orifice passage 72 will be produced more efficiently, and vibration damping effect based on flow action of the fluid will be produced more advantageously.

Additionally, the flow straightening apertures 76 are situated at equal intervals along the circumference; in the present embodiment, a pair of flow straightening apertures 76, 76 have been formed at locations on an axis lying in the diametrical direction. Thus, a large range can be established in the moveable film 54 for exertion of liquid pressure thereon so that elastic deformation of the moveable film 54 may be brought about efficiently. Moreover, in the present embodiment, because the flow straightening apertures 76 take the form of elongated passage holes extending in the axis-perpendicular direction, liquid pressure can be exerted over a wide area of the moveable film 54. By forming an even greater number of flow straightening apertures 76 on the circumference of the passage-defining rubber member 74, liquid pressure can be brought to bear over an even wider area of the moveable film 54.

Further, because liquid pressure is exerted on the moveable film 54 through the pair of flow straightening apertures 76, 76, the moveable film 54 will experience deformation in the same phase over a wide area. As a result, a large effective piston surface area of the moveable film 54 will be assured, and liquid pressure-transmitting action through deformation of the moveable film 54 will be produced effectively. For this reason, fluid flow through the second orifice passage 72 will be generated advantageously, producing the intended vibration damping effect.

Also, in the present embodiment, the end of the second orifice passage 72 on the intermediate chamber 62 side thereof is defined by middle communication hole 70 which extends in the axis-perpendicular direction, and the second orifice passage 72 connects with the peripheral well of the intermediate chamber 62. This prevents liquid pressure of the pressure-receiving chamber 58 transmitted to the intermediate chamber 62 through the second orifice passage 72 from acting in localized fashion on the moveable film 54, so that uniform elastic deformation may be brought about over a wider area of the moveable film 54. It will also be possible to avoid possible damage to the moveable film 54 caused by high pressure resulting from input of a shock load acting intensively on one part of the moveable film 54.

Figure 3:
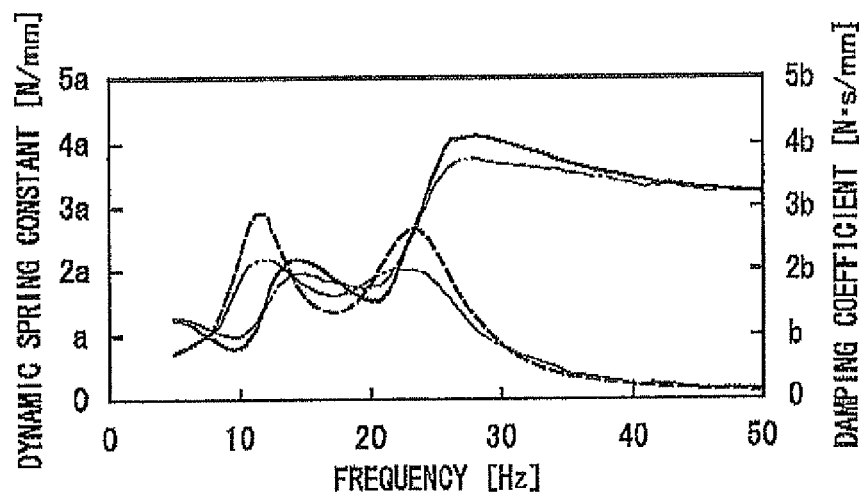
FIG. 3 is a graph demonstrating vibration damping characteristics of the engine mount of FIG. 1 observed upon input of small-amplitude vibration.

FIG. 3 is a graph depicting vibration damping characteristics observed when medium-amplitude vibration has been input to the engine mount 10, and depicts improvement in vibration damping capability attributed to the reasons discussed above. Specifically, according to FIG. 3, as compared to a construction (indicated by a thin single-dot and dash line and a thin double-dot and dash line) in which the partition plate body is composed of the cylindrical part 41 only, with the passage-defining rubber member 74 omitted (Comparative Example), a construction (indicated by a solid line and a broken line) according to the present embodiment (Example) may be clearly seen to exhibit outstanding low spring action and high attenuating action in a frequency range corresponding to idling vibration. In FIG. 3, the dynamic spring constant of the Example is indicated by the solid line, while the damping coefficient of the Example is indicated by the broken line; and the dynamic spring constant of the Comparative Example is indicated by the single-dot and dash line, while the damping coefficient of the Comparative Example is indicated by the double-dot and dash line.

In the present embodiment, at times of input of high-frequency vibration corresponding to driving rumble and the like, canceling vibration damping effect (low spring action) will be produced through minute deformations of the partition member 38 up and down in the axial direction resulting from relative pressure fluctuations of the pressure-receiving chamber 58 and the equilibrium chamber 60.

Figure 4:
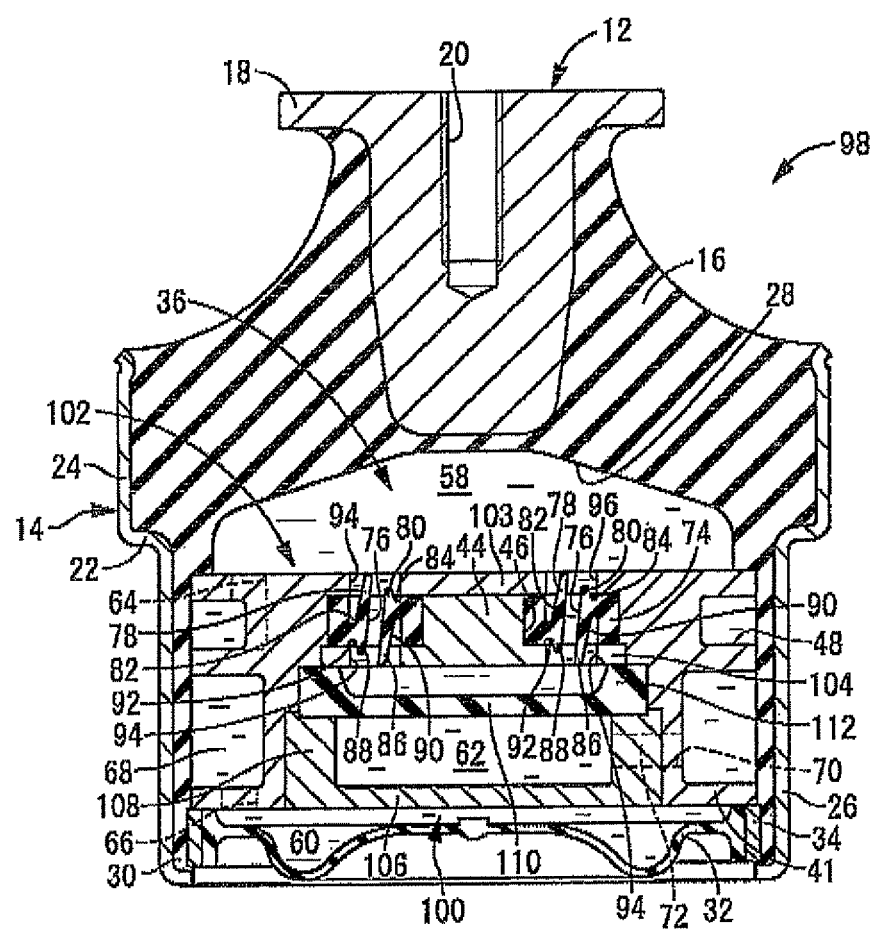
FIG. 4 is an devotional view in axial or vertical cross section of an engine mount according to a second embodiment of the present invention.

Next, FIG. 4 depicts an automotive engine mount 98 described as a second embodiment of the fluid-filled vibration damping device constructed according to the present invention. In the following description, components and parts that are substantially identical to those in the preceding first embodiment have been assigned like symbols in the drawings and are not discussed in detail.

Turning to a more detailed discussion, the engine mount 98 has a partition member 100. The partition member 100 has a partition member body 102. The partition member body 102 has an inverted, generally bottomed round cylindrical shape with a cylindrical part 41 and an upper base wall part 103, and a cover member 104 of generally circular disk shape has been slipped into the cylindrical part 41 and juxtaposed against the upper base wall part 103 from below. In the outside peripheral edge part of the partition member body 102 there has been formed a circumferential groove 48 that opens onto the outside peripheral face and extends for prescribed length in the circumferential direction.

A partition plate 106 for covering the opening is attached to the partition member body 102. The partition plate 106 has generally circular disk shape, with a protruding support part 108 of annular form integrally formed at the outside peripheral edge and protruding upward therefrom. It is then slipped from below into the bottom end of the cylindrical part 41 of the partition member body 102.

A moveable film 110 is situated between the opposed faces of the upper base wall part 103 and the partition plate 106 of the partition member body 102. The moveable film 110 has generally circular disk shape. A thick-walled pardon 112 of annular form that protrudes upward has been integrally formed in its outside peripheral edge portion. The moveable film 110 is arranged with its thick-walled portion 112 clasped between the upper base wall part 103 of the partition member body 102 and the protruding support part 108 of the partition plate 106, thereby positioning it so as to allow deformation of the diametrical center section.

As in the first embodiment described previously, the partition member 100 constructed thusly is arranged separating the pressure-receiving chamber 58 and the equilibrium chamber 60, with the cylindrical part 41 supported by the second mounting member 14. Utilizing the circumferential groove 48, a first orifice passage 68 is formed connecting the pressure-receiving chamber 58 with the equilibrium chamber 60. Additionally, the intermediate chamber 62 has been formed between the opposing faces of the partition plate 106 and the moveable film 110. The second orifice passage 72 has been formed connecting the equilibrium chamber 60 with the intermediate chamber 62.

A passage-defining rubber member 74 has been arranged in the housing zone 46 of the partition member 100; the upper openings of flow straightening apertures 76, 76 that have been formed in the passage-defining rubber member 74 connect to the pressure-receiving chamber 58, while the lower openings open towards the moveable film 110. That is, the partition member 100 in the present embodiment is equivalent to a vertically flipped construction of the partition member 38 shown in the preceding first embodiment. In the present embodiment, the flow straightening plate is constituted by the upper base wall part 103 and the cover member 104 of the partition member body 102, and by the passage-defining rubber member 74, with the pressure-receiving chamber 58 and the intermediate chamber 62 being partitioned by the flow straightening plate.

The engine mount 98 having such construction can afford advantages comparable to those of the engine mount 10 shown in the preceding first embodiment. Specifically, owing to a design whereby liquid pressure of the pressure-receiving chamber 58 is exerted on the moveable film 110 through the flow straightening apertures 76, liquid pressure of the pressure-receiving chamber 58 will undergo flow straightening so as to be exerted on the moveable film 110 over a wider area. For this reason, relative pressure fluctuations of the pressure-receiving chamber 58 and the intermediate chamber 62 will advantageously arise on the basis of changes in volume of the intermediate chamber 62, and vibration damping effect produced by fluid flow through the second orifice passage 72 will be improved.

Negative pressure reducing means adapted to prevent cavitation noise can also be provided between the upper base wall part 103 and the cover member 104 of the partition member body 102. As an example of such negative pressure reducing means, a housing recess is formed between the upper base wall part 103 and the cover member 104 of the partition member body 102 in the diametrically medial section; a passage hole is formed in the upper and lower wall of the housing recess, and valve body adapted to maintain the passage hole in the blocked state, as well as urging means therefor, are situated accommodated in the housing recess. Subsequently, through negative pressure of the pressure-receiving chamber 58 exerted on the valve body the valve body will experience displacement in opposition to the urging force of the urging means, switching the passage hole to the communicating state.

Figure 5:
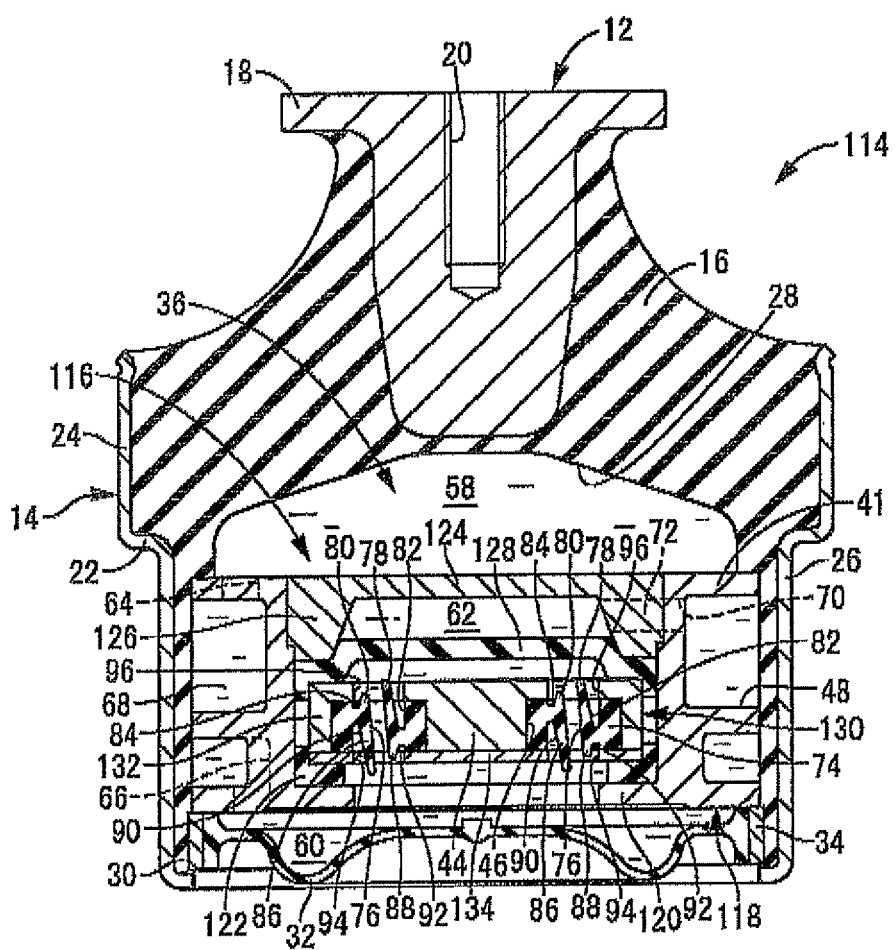
FIG. 5 is an elevational view in axial or vertical cross section of an engine mount according to a third embodiment of the present invention.

Next, FIG. 5 depicts an automotive engine mount 114 described as a third embodiment of the fluid-filled vibration damping device constructed according to the present invention. The engine mount 114 is furnished with a partition member 116. Additionally, the partition member 116 includes a partition member body 118.

The partition member body 118 has thick-walled, large-diameter, generally round cylindrical shape having formed in the outside peripheral edge portion thereof a circumferential groove 48 that extends in the circumferential direction for a prescribed distance equal to about twice around the circumference and that opens onto the outside peripheral face. A support piece 120 that protrudes towards the inside peripheral side has been integrally formed at the bottom end of the partition member body 118, and a supporting rubber elastic body 122 of generally annular shape has been anchored juxtaposed against the upper face thereof. The outside peripheral edge portion of the supporting rubber elastic body 122 is of upwardly protruding annular form.

A partition plate 124 has been arranged in the center bore of the partition member body 118. The partition plate 124 is a rigid member of generally circular disk shape having integrally formed at its outside peripheral edge a protruding support part 126 of annular form that protrudes out towards the bottom. The partition plate 124 has been attached at the upper end part of the center bore of the partition member body 118 so as to block the upper opening of the center bore.

A moveable film 128 has been arranged below the partition plate 124. The moveable film 128 has generally circular disk shape, in the outside peripheral section of which there has been formed a step, with the outside peripheral side of the step being situated below the inside peripheral side. The moveable film 128 is then positioned in the center bore of the partition member body 118, with the section thereof lying to the outside peripheral side of the step juxtaposed against the protruding support part 126 of the partition plate 124.

A housing 130 provided as a moveable dividing wall is situated axially between the support piece 120 and the moveable film 128. The housing 130 is of generally circular disk shape formed by a housing body 132 and a base plate fitting 134. The housing body 132 as a whole has bottomed, generally round cylindrical shape integrally furnished with a protruding part 44 that protrudes downward from its diametrical center section. Meanwhile, the base plate fitting 134 is generally circular disk shaped and has been secured juxtaposed against the bottom face of the housing body 132 to define the housing 130. A housing zone 46 of annular shape encircling the protruding part 44 is thereby defined in the interior of the housing 130. Additionally, an upper through-hole 96 has been formed in the upper wall part of the housing zone 46, while a lower through-hole 94 has been formed in the lower wall part of the housing zone 46. In the housing zone 46 of the housing 130 a passage-defining rubber member 74 has been positioned such that the upper and lower openings of the flow straightening apertures 76 communicate with the outside of the housing 130 through the upper and lower through-holes 96, 94, and the upper openings of the flow straightening apertures 76 open towards the moveable film 12S side. In the present embodiment, the housing 130 and the passage-defining rubber member 74 together constitute a flow straightening plate; the equilibrium chamber 60 and the intermediate chamber 62 are partitioned by the flow straightening plate.

The housing 130 is then arranged clasped between the axially opposed faces of the supporting rubber elastic body 122 and the outside peripheral section of the moveable film 128 so as to be elastically supported axially between the support piece 120 of the partition member body 118 and the protruding support part 126 of the partition plate 124. That is, the housing 130 is allowed to undergo minute displacements in the axial direction through elastic deformation of the supporting rubber elastic body 122 and the moveable film 128. The diametrical center section of the moveable film 128 is positioned spaced apart in the axial direction from both the partition plate 124 and the housing 130, thereby allowing minute elastic deformation in the axial direction.

By virtue of this arrangement, in the present embodiment there is provided a second vibrating sub-system (mass-spring system) in which the housing 130 and the passage-defining rubber member 74 function as the mass component, and the supporting rubber elastic body 122 and the moveable film 128 function as the spring component. In preferred practice the resonance frequency of the vibrating sub-system constituted by the partition member 116 and the seal rubber layer 30, and the resonance frequency of this second vibrating sub-system, will differ from one another.

The partition member 116 having the above construction is accommodated within the fluid chamber 36 and is supported by the second mounting member 14. The intermediate chamber 62 is thereby formed axially between the partition plate 124 and the moveable film 128; the pressure-receiving chamber 58 is formed to the opposite side of the partition plate 124 from the intermediate chamber 62; and the equilibrium chamber 60 is formed to the opposite side of the housing 130 from the intermediate chamber 62. The flow straightening apertures 76 have been disposed so as to connect the equilibrium chamber 60 side and the intermediate chamber 62 side.

The engine mount 114 constructed in the above manner can afford advantages comparable to those afforded by the engine mount 10 shown in the previous first embodiment. In the present embodiment, by providing a second vibrating sub-system, effective vibration damping effect against high-frequency vibration corresponding to driving rumble and the like can be obtained through canceling action afforded by resonance of the second vibrating sub-system.

Further, in the present embodiment, because the housing 130 which houses the passage-defining rubber member 74 is elastically supported by the partition member body 118, during switching of the flow straightening apertures 76 to the blocked state, noise produced by the upper and lower valve-like rubber protrusions 78, 86 and the upper and lower cushioning protrusions 80, 88 striking thereagainst will be reduced in severity or prevented from being transmitted to the vehicle body side via the second mounting member 14.

The engine mount 114 shown in the present embodiment may employ a construction in which the partition member 116 has been vertically flipped in a manner analogous to the engine mount 98 shown in the preceding second embodiment with respect to the engine mount 10 shown in the first embodiment.

While the present invention has been described in several preferred embodiments, it is to be understood that these are merely exemplary, and invention is by no means limited to the specific disclosures given in these embodiments.

For example, while the preceding first to third embodiments show constructions in which the partition member 38, 100, or 116 is furnished with a flow straightening plate composed of a passage-defining rubber member 74 having flow straightening apertures 76, the passage-defining rubber member 74 may be dispensed with, and instead passage holes could be bored in the lower wall part or upper wall part of the partition member body for example, with these passage holes constituting the flow straightening apertures. Nor is it essential for the flow straightening apertures to be given elongated slit form, and passage holes having circular or rectangular cross section for example could be employed instead.

Also, while in the preceding first to third embodiments, the flow limiting member for switching the openings of the flow straightening apertures 76 between the open state and the blocked state are shown to have constructions in which upper and lower valve-like rubber protrusions 78, 86 have been integrally formed with the passage-defining rubber member 74, these constructions are merely exemplary, and the specific construction of the flow limiting member is not limited to those shown in the embodiments. As a specific example of another possible arrangement, a rubber valve of circular disk shape larger in diameter than a flow straightening aperture defined by a circular passage hole is provided; a plate spring made of metal is arranged elastically supporting the rubber valve with respect to the partition member in such a way that, in the absence of input vibration, the plate spring will maintain the rubber valve away from the opening of the flow straightening aperture, whereas in response in a change in liquid pressure caused by vibration input the rubber valve will be urged into proximity with the opening of the flow straightening aperture in opposition to the elastic force of the spring so that the flow straightening aperture becomes blocked by the rubber valve. That is, it is possible to employ flow limiting valves of various types as the flow limiting member.

Additionally, while the preceding first to third embodiments show constructions in which the moveable film 54, 110, or 128 is positioned between the partition plate 50, 106, 124 and the flow straightening plate (the passage-defining rubber member 74 and part of the partition member body 40 or 102 or the housing 130), an alternative construction in which the flow straightening plate is situated for example between the partition plate and the moveable film could also be employed. As an additional example, a first flow straightening plate could be situated between the partition plate and the moveable film, and a second flow straightening plate could be situated on the opposite side of the moveable film from the first flow straightening plate. Through this arrangement, exertion of uneven liquid pressure on the moveable film can be eliminated more advantageously, so as to more advantageously ensure efficient levels of fluid flow through the second orifice passage arising from elastic deformation of the moveable film to a sufficient extent. Where the above construction is employed, the second orifice passage will provide open passage between the partition plate and the flow straightening plate (first flow straightening plate).

Moreover, in the preceding first to third embodiments, the end of the second orifice passage 72 on the intermediate chamber 62 side thereof has been designed to extend in the axis perpendicular direction and to open into the peripheral wall of the intermediate chamber 62; however, the second orifice passage could instead be formed so as to pass through the partition plate in the axial direction for example. Alternatively, a plurality of passage holes could be formed in the partition plate and the second orifice passage could be formed cooperatively by the plurality of passage holes, to better disperse liquid pressure exerted on the moveable film.

While in the preceding first to third embodiments the fluid-filled vibration damping device according to the present invention was shown implemented in an automotive engine mount, the present invention has potential application in non-automotive applications, and may be favorably adapted, for example, as a fluid-filled vibration damping device for use in rolling stock, motorized two-wheel vehicles, or the like. Nor is the invention limited to engine mounts, and may instead be implemented in a body mount, subframe mount, or diff mount for example.

What is claimed is:

1. A fluid-filled vibration damping device comprising:
a first mounting member;
a second mounting member;
a main rubber elastic body elastically connecting the first and second mounting members;
a partition plate supported by the second mounting member;
a pressure-receiving chamber disposed on one side of the partition plate and filled with a non-compressible fluid;
an equilibrium chamber disposed on another side of the partition plate and filled with the non-compressible fluid;
a first orifice passage which connects the pressure-receiving chamber and the equilibrium chamber;
a moveable film arranged to either a pressure-receiving chamber side or an equilibrium chamber side of the partition plate and being spaced a prescribed distance away therefrom to define an intermediate chamber situated between opposed faces of the partition plate and the moveable film such that the moveable film is elastically deformable while being held at an outer peripheral edge thereof;
a second orifice passage which connects the intermediate chamber and one of the pressure-receiving chamber and the equilibrium chamber which are separated from the intermediate chamber by the partition plate, the second orifice passage being tuned to higher frequency than the first orifice passage; and
a flow straightening plate being arranged in opposition to the moveable film from at least one of the intermediate chamber side and an opposite side thereof, the flow straightening plate having a plurality of flow straightening apertures formed therein opening towards the moveable film and being furnished with a flow limiting member, the flow limiting member being formed on the flow straightening plate and being adapted to limit fluid flow level through the flow straightening apertures at times of input of vibration in a frequency range to which the first orifice passage has been tuned.

2. The fluid-filled vibration damping device according to claim 1, wherein the flow straightening plate is situated to the opposite side of the moveable film from the partition plate, with the intermediate chamber being defined between the partition plate and the moveable film, and with an end of the second orifice passage opening onto a peripheral wall of the intermediate chamber.

3. The fluid-filled vibration damping device according to claim 1, wherein the flow straightening plate is furnished with a passage-defining rubber member, the passage-defining rubber member having the flow straightening apertures formed therein; the flow limiting member comprises a protruding valve-like rubber protrusion formed at least at one opening of the flow straightening aperture; the valve-like rubber protrusion in an initial configuration thereof is positioned away from the opening of the flow straightening aperture so that the flow straightening aperture is maintained in a communicating state; and in response to relative pressure fluctuations of the pressure-receiving chamber and the equilibrium chamber the valve-like rubber protrusion undergoes elastic deformation, and moves into proximity with the opening of the flow straightening aperture and blocks the flow straightening aperture.

4. The fluid-filled vibration damping device according to claim 1, wherein the plurality of flow straightening apertures include a plurality ones formed at equidistant intervals along a circumference about a center of the flow straightening plate.

* * * * *